(12) United States Patent
Young

(10) Patent No.: US 8,141,894 B1
(45) Date of Patent: Mar. 27, 2012

(54) CUSTOM CYLINDER GRATE ASSEMBLY (CCGA)

(76) Inventor: Terry Alan Young, Rineyville, KY (US)

( * ) Notice: Subject to any disclaimer, the term of this patent is extended or adjusted under 35 U.S.C. 154(b) by 207 days.

(21) Appl. No.: 12/798,008

(22) Filed: Mar. 29, 2010

Related U.S. Application Data

(60) Provisional application No. 61/167,584, filed on Apr. 8, 2009.

(51) Int. Cl.
*B62J 27/00* (2006.01)
*B62J 9/02* (2006.01)

(52) U.S. Cl. ............... 280/304.3; 280/288.4; 280/304.4; 180/219; 224/413; 224/434; 224/445; 224/447; 224/545

(58) Field of Classification Search ............... 280/304.3, 280/304.4, 288.4; 180/219; 224/413, 434, 224/445, 447, 545
See application file for complete search history.

(56) References Cited

U.S. PATENT DOCUMENTS 5,614,280 A * 3/1997 Hanna .............................. 428/74
6,328,013 B1 * 12/2001 Calhoun .................... 123/198 D

* cited by examiner

*Primary Examiner* — Joanne Silbermann
*Assistant Examiner* — Marlon Arce

(57) ABSTRACT

An invention apparatus designed to serve as a functional add-on accessory for V-twin cylinder motorcycle engines. The invention Custom Cylinder Grate Assembly (CCGA) is configured to perform three functions simultaneously as the invention protects V-twin engine cylinders from damage, reduces the risk potential burn injuries to motorcycle operators and provides an attractive custom appearance for the V-twin engine cylinders. Components of the invention are designed to encircle the V-twin engine cylinders shielding the cylinders from damage caused by flying road debris and exposure to environmental elements. The invention serves as a physical barrier between hot V-twin engine cylinders and the motorcycle operator. The inventions barrier prohibits the motorcycle rider from direct contact with the hot V-twin engine cylinders, mitigating the risk of burns or injury to the rider. The invention replicates the silhouette of V-twin engine cylinders, masking unsightly V-twin engine cylinders while providing a cosmetic custom appearance for the motorcycle and the V-twin engine cylinders.

5 Claims, 5 Drawing Sheets

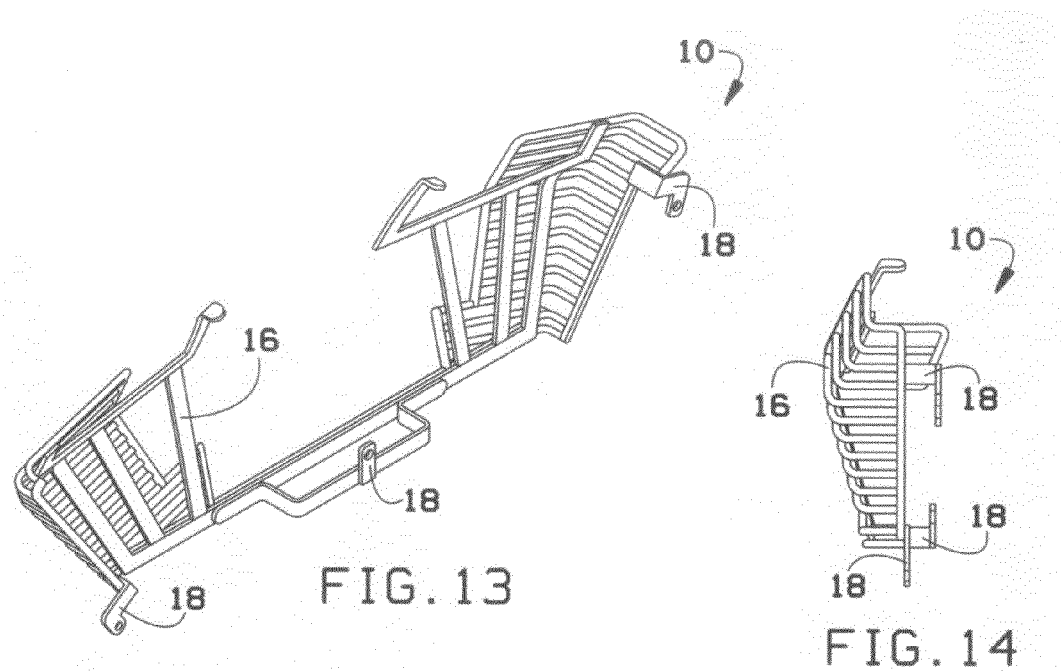
FIG. 13
FIG. 14
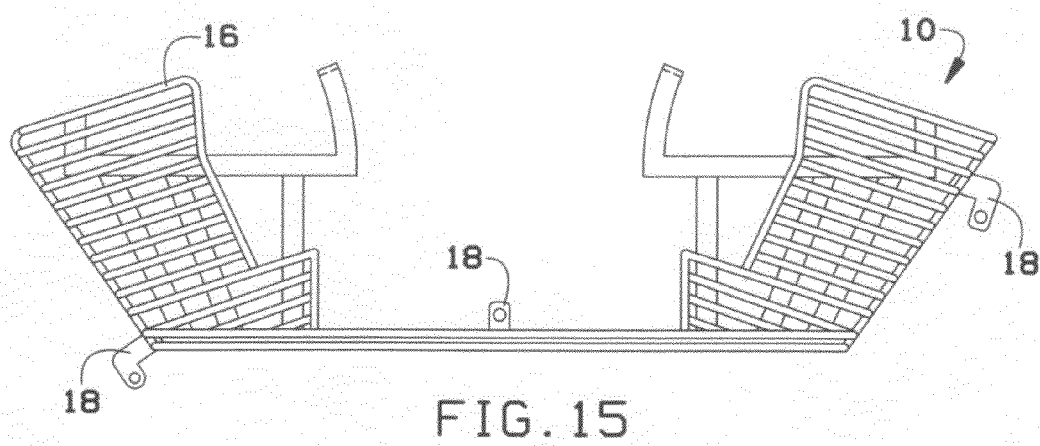
FIG. 15
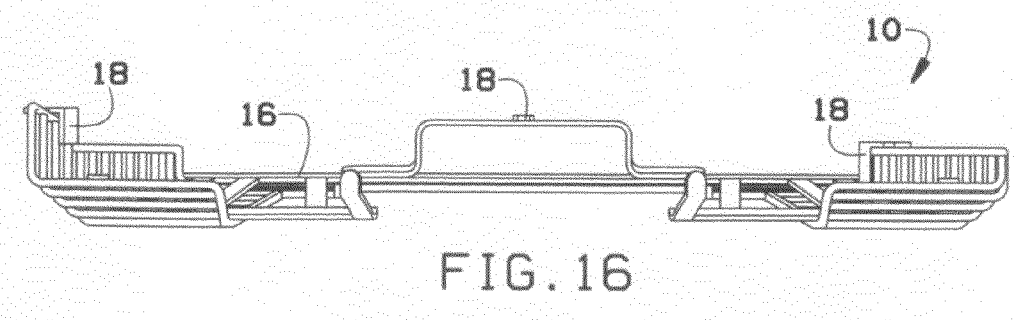
FIG. 16

CUSTOM CYLINDER GRATE ASSEMBLY (CCGA)

CROSS-REFERENCED TO RELATED APPLICATIONS

This application claims the benefit of U.S. Provision Patent Application No. 61/167,584 filed on Apr. 8, 2009.

FEDERALLY SPONSORED RESEARCH

Not Applicable

SEQUENCE LISTING OR PROGRAM

Not Applicable

BACKGROUND OF THE INVENTION

Motorcycle V-twin engine cylinders are unprotected against road debris and environmental elements. This exposure leaves the motorcycle V-twin engine cylinders susceptible to damage from road or flying debris and over time unsightly appearance caused by environmental elements or surface damage resulting in pits, chips and corrosion. V-twin engine cylinder damage or unattractive appearance requires that the V-twin engine be disassembled for cylinder replacement, refinishing or repair. The disassembly process is undesirable for motorcycle enthusiasts because of temporary loss of use of the motorcycle and cost associated with the procedure.

Motorcycle V-twin engine cylinders generate heat during operation which leaves the operator vulnerable to burn injuries if the operator comes into contact with the hot V-twin engine cylinders. In the event of a motorcycle accident the potential exists for hot V-twin engine cylinders to rest against the motorcycle operator's body which could cause severe burn injuries. Burn injury potential to the motorcycle operator caused by touching the hot V-twin engine cylinders is always present as the V-twin motorcycle engine is not designed or equipped with a barrier or shield to prevent direct contact with the hot V-twin engine cylinders.

Heat produced by the V-twin engine cylinders during operation tends to discolor the cylinders over time making them unsightly in appearance. To correct the unsightly discoloring appearance the engine is typically disassembled for cylinder replacement or refinishing. The engine disassembly option to correct appearance of the V-twin engine cylinders is undesirable and cost prohibitive for many motorcycle owners.

Motorcycle owners and patrons are opposed to add-on accessories for V-twin motorcycle engines that require special mechanical skills and tools to install the add-on accessories. Motorcycle enthusiasts prefer V-twin motorcycle engine add-on accessories that require no maintenance, can be installed in minimal time, and are easily removed and replaced for the purpose of cleaning or repair of the V-twin cylinder motorcycle engine.

Motorcycle owners, riders and enthusiasts desire visually appealing V-twin engine accessories for their motorcycles. Motorcycle patrons prefer that add-on V-twin engine accessories perform some sort of function in a manner to further enhance the riding experience without modifications to the V-twin engine. Motorcycle enthusiasts also prefer that add-on V-twin engine accessories do not impede the engine performance or overall operation and functionality of the motorcycle. V-twin type motorcycle engines are used on numerous motorcycle models, brands, types, styles and build years. With this in mind, motorcycle patrons desire options to acquire add-on V-twin engine accessories to support their specific motorcycle needs. Motorcycle owners also prefer that add-on V-twin engine accessories provide a custom look by virtue of design materials, size, finishes, trimmings and visual aesthetics to complement the motorcycles overall appearance.

In view of the enumerated problems described above and the fact that currently there is no solution available, it is apparent that there exists a need for a functional add-on V-twin engine accessory apparatus to address and resolve these issues for V-twin style motorcycle engine cylinders. The present invention Custom Cylinder Grate Assembly (CCGA) supplies motorcycle enthusiasts with a functional invention that solves all of the aforementioned V-twin cylinder engine problems and concerns simultaneously. The present invention Custom Cylinder Grate Assembly (CCGA) design and objectives provide V-twin motorcycle engine cylinder protection, risk reduction of burn injuries to operators and an appealing cosmetic custom appearance. It is the purpose of the present invention to fulfill the needs as expressed through illustrations as well as other needs which will become more apparent as further defined and provided in the following disclosure.

BRIEF SUMMARY OF THE INVENTION

An object of the present invention titled as the Custom Cylinder Grate Assembly (CCGA) is that, as an add-on V-twin engine accessory apparatus with multiple functionality, it simultaneously solves three problems associated with V-twin type motorcycle engine cylinders. The present invention resolves issues in terms of V-twin motorcycle engine cylinder protection, motorcycle operator burn injury protection and provides a cosmetic aesthetic custom appearance.

Another object of the present invention is that it an apparatus designed to reduce the risk of the motorcycle operator from potential burns and injury caused by accidently touching hot V-twin motorcycle engine cylinders or by having bodily contact with hot V-twin engine cylinders during a motorcycle accident. Components of the invention are designed to encircle V-twin engine cylinders. The present invention is designed in a fashion to provide approximately a one inch displacement barrier between hot V-twin engine cylinders and the motorcycle operator. The approximate one inch displacement barrier provides ample space between the V-twin engine cylinders and the operator. The approximate one inch displacement barrier prohibits the motorcycle rider from direct contact with the V-twin engine cylinders therefore reducing the risk of potential burn injuries. The approximate one inch displacement of the present invention further provides an adequate gap for proper airflow around the V-twin engine cylinders for cooling purposes.

Yet another object of the present invention is that it an apparatus designed to eliminate the need to replace or refinish V-twin engine cylinders due to surface damage, unsightly appearance and discoloring caused by heat during V-twin motorcycle engine operation. The present invention serves as a cost effective alternative for motorcycle enthusiasts to mask the view of undesirable exterior appearance of discolored, pitted, chipped or corroded V-twin engine cylinders. The present invention provides a custom cosmetic appearance to the front, rear and sides of the V-twin motorcycle engine cylinders without operability down time.

Still another object of the present invention is that it an apparatus that protects the V-twin motorcycle engine cylinders from damage caused from fling road debris and unsightly appearance associated with exposure to environmental elements. The present invention parallels the profile of the V-twin engine cylinders and surrounds the exterior of the V-twin engine cylinders to serve as a protective barrier from road debris and environmental elements. Components of the present invention are comprised of durable metal materials that can sustain impact of debris protecting the cylinders from damage while simultaneously shielding the V-twin engine cylinders from environmental elements.

Yet another object of the present invention is that the apparatus serves as a functional add on V-twin engine accessories that replicates the silhouette of the V-twin motorcycle engine cylinders and provides a cosmetic custom appearance. The present inventions exterior surface can be covered with a variety of top coat finishes to accommodate specific or custom appearances based on preference of the motorcycle owner. The top coat finish for the present invention can include, but is not limited to, chrome plating, gold plating, nickel plating, powder coating and paint.

Still another object of the present invention is that the apparatus can support a variety of add-on additions and bolt-on trimmings that can be affixed to the invention. The add-on additions and trimmings can provide the motorcycle enthusiast an opportunity to further compliment the present inventions custom appearance with a unique or personal touch. These add-on additions and trimmings can include, but are not limited to, medallions, logos, emblems and personalized plates.

Yet another objective of the present invention is that the apparatus can be configured to adapt to a vast array of brands, styles, models and build years of motorcycles equipped with the V-twin cylinder type design motorcycle engine. Based on motorcycle enthusiast preferences, the present invention can accommodate various types and sizes of engine air cleaners for both carbureted and fuel injected V-twin cylinder motorcycle engines.

Still another object of the present invention is that the apparatus requires no modifications to the motorcycle to mount the invention. Installation of the invention requires no special tools, skills or specific mechanical aptitude and it can be mounted by the motorcycle enthusiast in minimal time using common hand tools.

Yet another object of the present invention is that the apparatus does not require any form of maintenance for functionality. The present invention can be easily removed and reinstalled for purpose of cleaning and mechanical repairs on the V-twin motorcycle engine.

Still another object of the present invention is that the apparatus does not hinder or obstruct V-twin cylinder motorcycle engine performance, engine functionality or overall operation of the motorcycle.

Yet another object of the present invention is that the apparatus can be constructed of various types, sizes or forms of metal materials and can be arranged in a variety of fashion. These types of metal materials can include, but are not limited to, steel, stainless steel, aluminum, copper, various alloy materials, square stock, round stock, pipe and tubing.

BRIEF DESCRIPTION OF DRAWINGS

FIG. 13 is a perspective view of the present invention illustrating the Right Side Cylinder Grate.

FIG. 14 is a front view of the present invention illustrating the Right Side Cylinder Grate.

FIG. 15 is a side view of the present invention illustrating the Right Side Cylinder Grate.

FIG. 16 is a top view of the present invention illustrating the Right Side Cylinder Grate.

DETAILED DESCRIPTION OF THE INVENTION

For a more complete understanding of the present invention and advantages thereof, reference is now made to the following description of various illustrative and non-limiting embodiments thereof, taken in conjunction with accompanying drawings in which like reference indicate like features.

Figure 1:
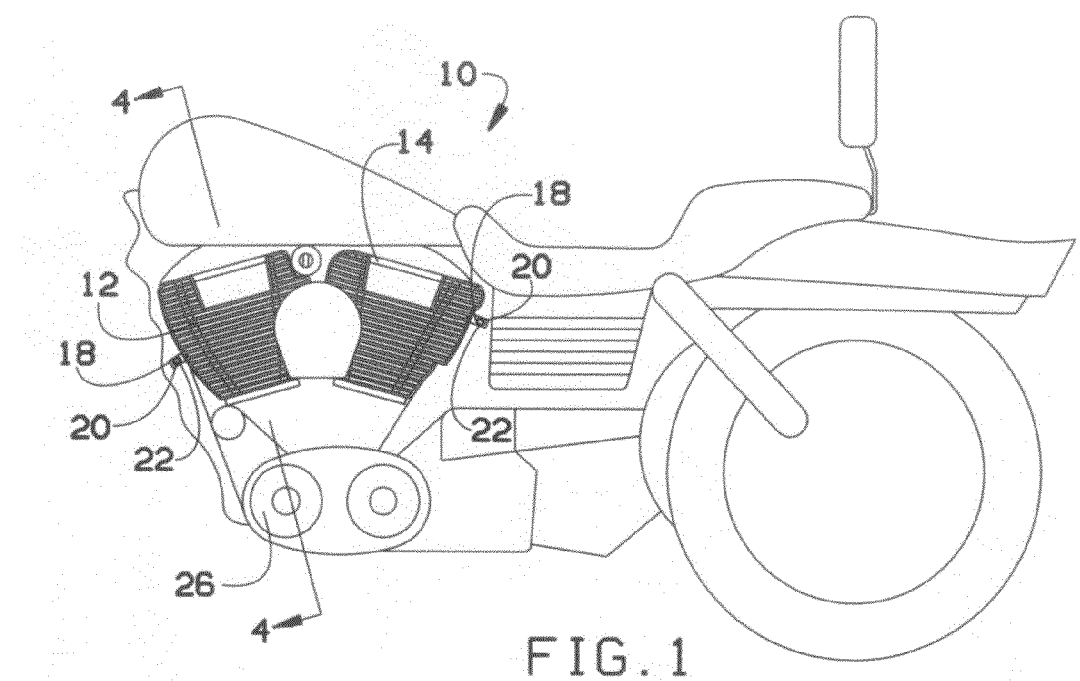
FIG. 1 illustrates a side view of the present invention Custom Cylinder Grate Assembly (CCGA) mounted on a V-twin motorcycle engine with front and rear engine cylinders.
Figure 2:
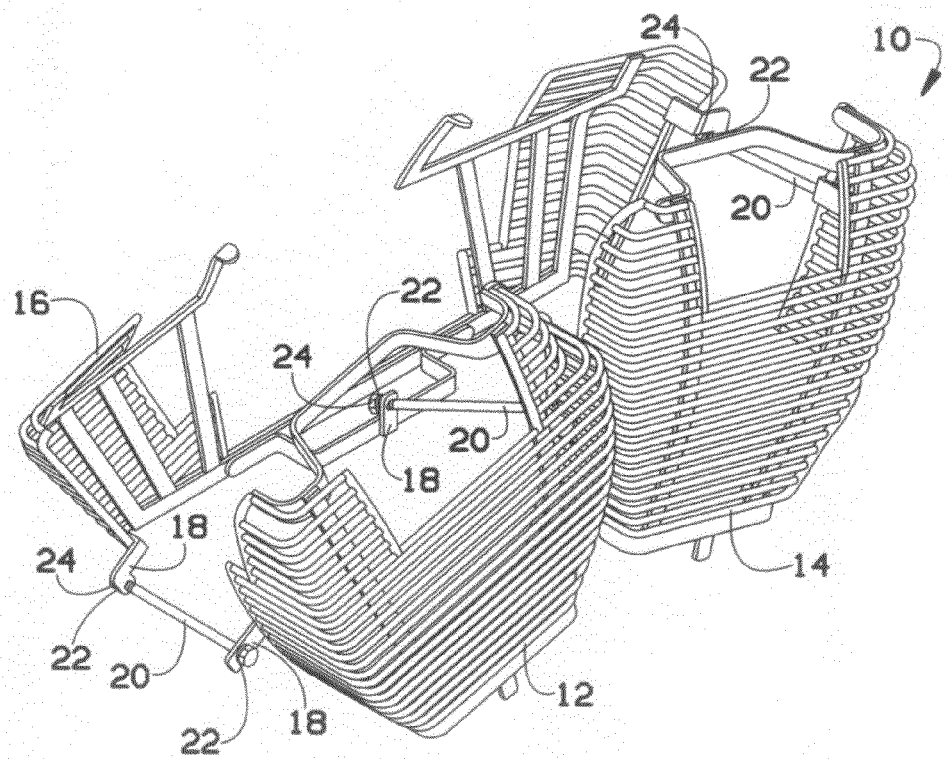
FIG. 2 illustrates a perspective view of the present invention Custom Cylinder Grate Assembly (CCGA).
Figure 3:
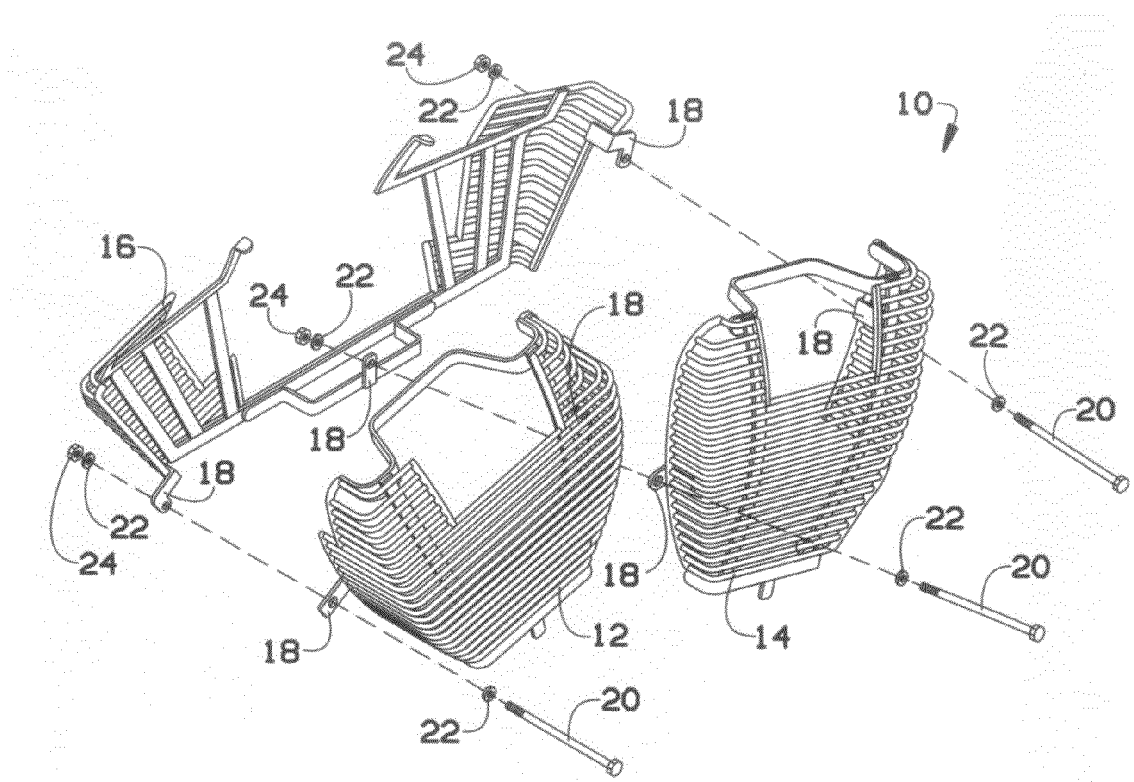
FIG. 3 illustrates an exploded perspective view of the present invention Custom Cylinder Grate Assembly (CCGA).

Referring initially to FIG. 1, FIG. 2 and FIG. 3, the present invention Custom Cylinder Grate Assembly (CCGA) 10 is comprised of three main components the left side front cylinder grate 12, left side rear cylinder grate 14 and right side cylinder grate 16. As shown in FIG. 1 the three main components are essential elements of the present invention as they are supportive of each as an assembly for functionality of the invention when mounted onto the V-twin motorcycle engine with front and rear cylinders 26. Referencing FIG. 2 fabrication of the three main components left side front cylinder grate 12, left side rear cylinder grate 14 and right side cylinder grate 16 involves elements of welding, precise measurements, metal bending and metal shaping.

Referring now to FIG. 2, FIG. 3, FIG. 5, FIG. 6, FIG. 7 and FIG. 8, the left side front cylinder grate 12 is configured from a series of formed ½"×⅛" thick flat steel and 3/16" round steel dowel rod. The flat and round steel metal materials are cut to length, contoured, shaped, aligned, spaced to precise measurement, and welded together in a configuration to replicate the exterior facade of the front cylinder on the V-twin motorcycle engine with front and rear cylinders 26 as shown in FIG. 1. The ½"×⅛" thick flat steel is contoured, cut and welded together horizontally and vertically to serve as a support structure for the left side front cylinder grate 12. The 3/16" round steel dowel rods are bent and cut to size to produce a progressive contoured image of the V-twin motorcycle engine with front and rear cylinders 26. The 3/16" round steel dowel rods are welded horizontally to the ½"×⅛" thick flat steel support structure and configured with a 3/16" space between each of 3/16" round steel dowel rods to provide sufficient airflow to the V-twin motorcycle engine.

Figure 6:
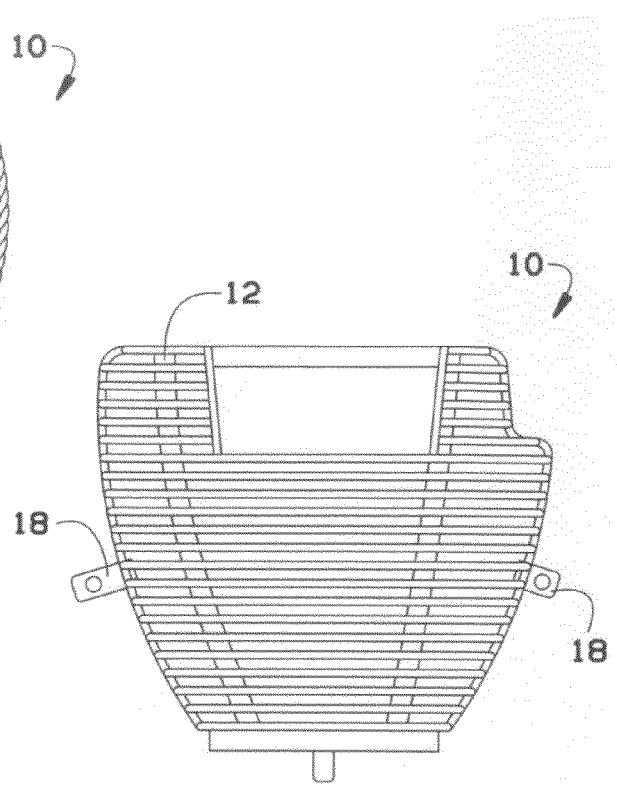
FIG. 6 is a side view of the present invention illustrating the Left Side Front Cylinder Grate.
Figure 7:
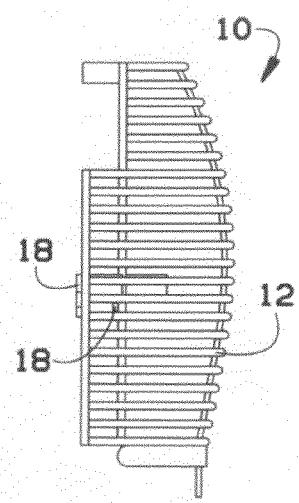
FIG. 7 is a front view of the present invention illustrating the Left Side Front Cylinder Grate.
Figure 8:
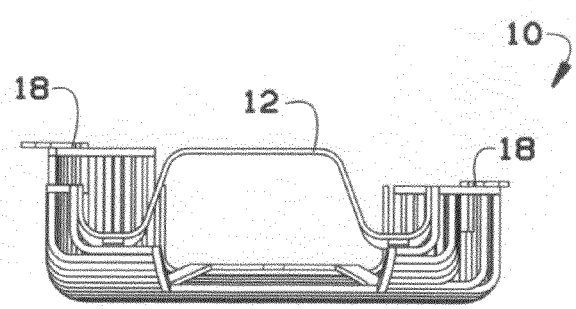
FIG. 8 is a top view of the present invention illustrating the Left Side Front Cylinder Grate.
Figure 9:
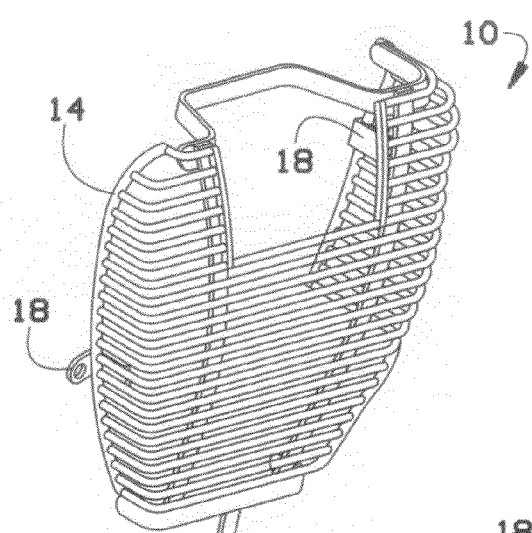
FIG. 9 is a perspective view of the present invention illustrating the Left Side Rear Cylinder Grate.

Referring now to FIG. 6, the left side front cylinder grate 12 is constructed with two mounting brackets 18. The mounting brackets 18 are devised of ½"×⅛" thick flat steel material with ¼" hole drilled through the center. The two mounting brackets 18 are welded in position protruding approximately 1" past the sides of the left side front cylinder grate 12 for purpose of mounting the overall invention Custom Cylinder Grate Assembly (CCGA) 10.

Figure 4:
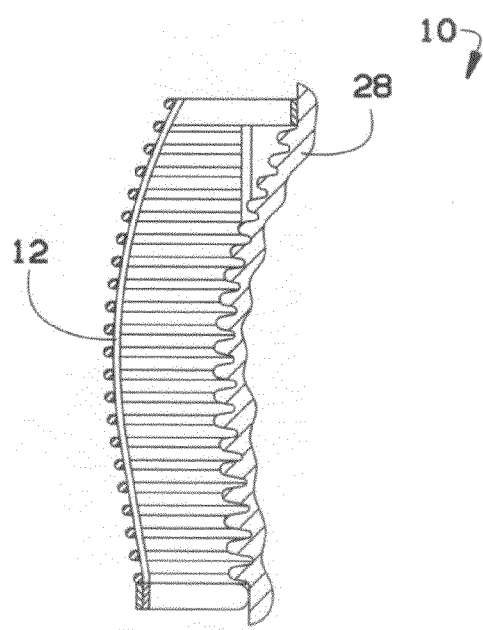
FIG. 4 illustrates a section view of the present invention Custom Cylinder Grate Assembly (CCGA) taken along line 4-4 in FIG. 1.
Figure 5:
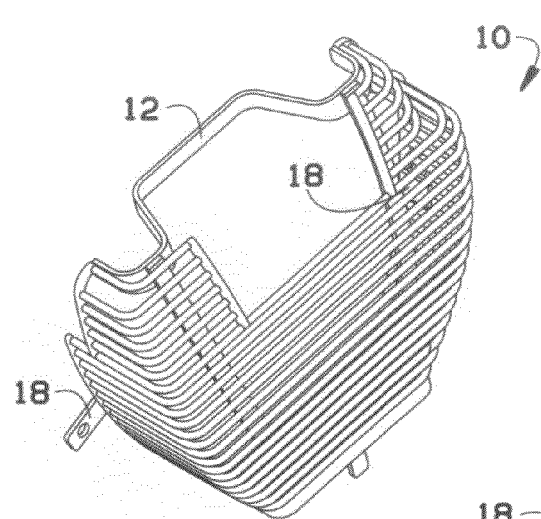
FIG. 5 is a perspective view of the present invention illustrating the Left Side Front Cylinder Grate.

Referring now to FIG. 4, the upper and lower horizontal metal components of the left side front cylinder grate 12 is designed in a fashion to rest against the horizontal top and bottom surfaces of the in V-twin motorcycle engine cylinder 28. The left side front cylinder grate 12 is contoured, indented, and is configured to mount adjacent to the left side front V-twin motorcycle engine cylinder 28. The left side front cylinder grate 12 is offset away from the side of the engine approximately 1" to provide adequate airflow for cooling of the V-twin motorcycle engine cylinder 28 and for physical separation between the motorcycle operator and the hot surface of the V-twin motorcycle engine cylinder 28 Upon mounting, the left side front cylinder grate 12 it replicates the contour and outline of V-twin motorcycle engine cylinder 28, further providing a custom appearance.

Referring now to FIG. 2, FIG. 3, FIG. 9, FIG. 10, FIG. 11 and FIG. 12, the left side rear cylinder grate 14 is configured from a series of formed ½"×⅛" thick flat steel and 3/16" round steel dowel rod. The flat and round steel metal materials are cut to length, contoured, shaped, aligned, spaced to precise measurement and welded together in a configuration to replicate the exterior facade of the rear cylinder on the of the V-twin motorcycle engine with front and rear cylinders 26 as shown in FIG. 1. The ½"×⅛" thick flat steel is contoured, cut and welded together horizontally and vertically to serve as a support structure for the left side rear cylinder grate 14. The 3/16" round steel dowel rods are bent and cut to size to produce a progressive contoured image of the V-twin motorcycle engine with front and rear cylinders 26. The 3/16" round steel dowel rods are welded horizontally to the ½"×⅛" thick flat steel support structure and configured with a 3/16" space between each of 3/16" round steel dowel rods to provide sufficient airflow to the V-twin motorcycle engine.

Figure 10:
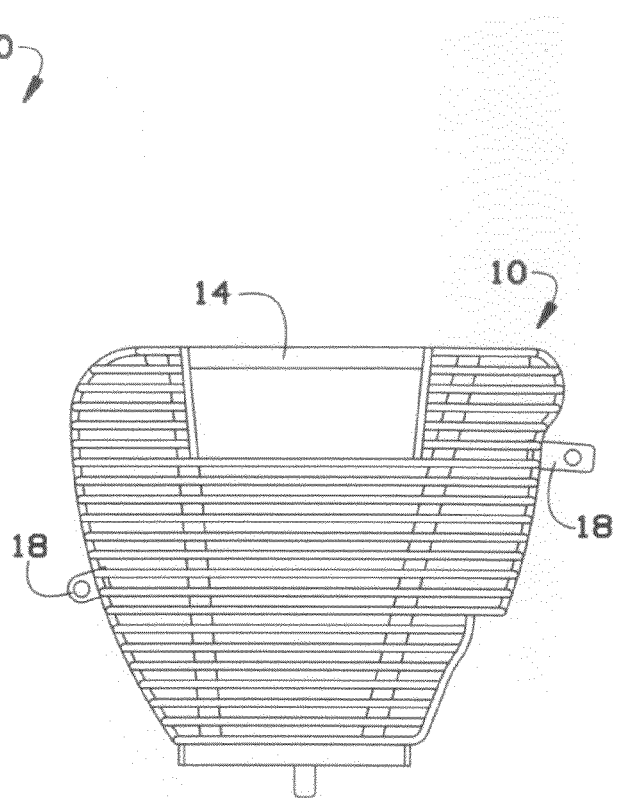
FIG. 10 is a side view of the present invention illustrating the Left Side Rear Cylinder Grate.

Referring now to FIG. 10, the left side rear cylinder grate 14 is constructed with two mounting brackets 18. The mounting brackets 18 are devised of ½"×⅛" thick flat steel material with ¼" hole drilled through the center. The two mounting brackets 18 are welded in position protruding approximately 1" past the sides of the left side rear cylinder grate 14 for purpose of mounting the overall invention Custom Cylinder Grate Assembly (CCGA) 10.

Figure 11:
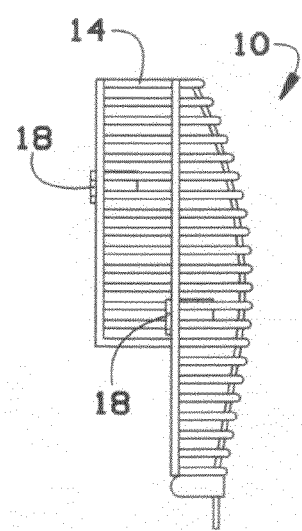
FIG. 11 is a front view of the present invention illustrating the Left Side Rear Cylinder Grate.
Figure 12:
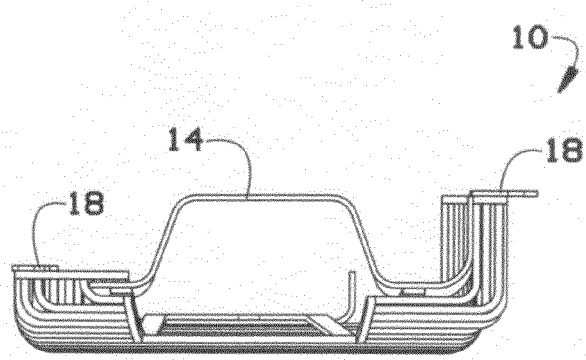
FIG. 12 is a top view of the present invention illustrating the Left Side Rear Cylinder Grate.

Referring now to FIG. 11, the left side rear cylinder grate 14 mounting and function characteristics replicate that of the left side front cylinder grate 12 as shown in FIG. 4 and defined in aforementioned paragraph [0041]. As represented in FIG. 4 for the left side front cylinder grate 12 the left side rear cylinder grate 14 are equivalent in design and mounts by resting against the horizontal top and bottom surfaces of the in V-twin motorcycle engine cylinder 28. The left side rear cylinder grate 14 is contoured, indented, and is configured to mount adjacent to the left side rear V-twin motorcycle engine cylinder 28. The left side rear cylinder grate 14 is offset away from the side of the engine approximately 1" to provide adequate airflow for cooling of the V-twin motorcycle engine cylinder 28 and for physical separation between the motorcycle operator and the hot surface of the V-twin motorcycle engine cylinder 28. Upon mounting, the left side rear cylinder grate 14 it replicates the contour and outline of V-twin motorcycle engine cylinder 28, further providing a custom appearance.

Referring now to FIG. 2, FIG. 3, FIG. 13, FIG. 14, FIG. 15 and FIG. 16, the right side cylinder grate 16 is configured from a series of formed ½"×⅛" thick flat steel and 3/16" round steel dowel rod. The flat and round steel metal materials are cut to length, contoured, shaped, aligned, spaced to precise measurement and welded together in a configuration to replicate the exterior facade of the of the front and rear cylinders on the right side of the V-twin motorcycle engine with front and rear cylinders 26 as shown in FIG. 1. The ½"×⅛" thick flat steel is contoured, cut and welded together horizontally and vertically to serve as a support structure for the right side cylinder grate 16. The 3/16" round steel dowel rods are bent and cut to size to produce a progressive contoured image of the V-twin motorcycle engine with front and rear cylinders 26. The 3/16" round steel dowel rods are welded horizontally to the ½"×⅛" thick flat steel support structure and configured with a 3/16" space between each of 3/16" round steel dowel rods to provide sufficient airflow to the V-twin motorcycle engine.

Referring now to FIG. 15, the right side cylinder grate 16 is constructed with three mounting brackets 18. The mounting brackets 18 are devised of ½"×⅛" thick flat steel material with ¼" hole drilled through the center. Referencing FIG. 3 the three mounting brackets 18 are welded in position to align with the two mounting brackets 18 on left side front cylinder grate 12 and the two mounting brackets 18 on the left side rear cylinder grate 14 for purpose of mounting the overall invention Custom Cylinder Grate Assembly (CCGA) 10.

Referring now to FIG. 14, the right side cylinder grate 16 mounting and function characteristics replicate that of the left side front cylinder grate 12 as shown in FIG. 4 and defined in aforementioned paragraph [0041]. As represented in FIG. 4 for the left side front cylinder grate 12 the right side cylinder grate 16 mounts by resting against the horizontal top and bottom surfaces of the in V-twin motorcycle engine cylinder 28. The right side cylinder grate 16 is contoured, indented, and is configured to mount adjacent to the right side front and rear front V-twin motorcycle engine cylinders 28 The right side cylinder grate 16 is offset away from the side of the engine approximately 1" to provide adequate airflow for cooling of the V-twin motorcycle engine cylinder 28 and for physical separation between the motorcycle operator and the hot surface of the V-twin motorcycle engine cylinder 28. Upon mounting, the right side cylinder grate 16 it replicates the contour and outline of V-twin motorcycle engine cylinder 28, further providing a custom appearance.

Referring now to FIG. 3, the mounting hardware required for assembly of the overall invention Custom Cylinder Grate Assembly (CCGA) 10 is comprised of three objects which include the mounting bolts 20, mounting flat washers 22 and mounting lock nuts 24. There are a total of three mounting bolts 20 required they are of a steel design and are ¼" in diameter and are approximately 6" in length with threads on one end and a 7/16" bolt head size on the opposite end. There are a total of six mounting flat washers 22 required they are of a steel design with a ¼" diameter hole in the center. There are a total of three mounting lock nuts 24 required they are of a steel design and are threaded through the center with a nylon insert protruding from one end with an exterior bolt head size of 7/16".

Referring now to FIG. 1, FIG. 2 and FIG. 3, assembly of the overall invention Custom Cylinder Grate Assembly (CCGA) 10 is accomplished by performing the following steps and procedures. Although the assembly of the Custom Cylinder Grate Assembly (CCGA) 10 can be performed by one person, it is recommended to have an assistant aid with the process. Step 1 is performed by aligning and positioning the left side front cylinder grate 12 adjacent to the left front cylinder of the V-twin motorcycle engine 26. Step 2 is performed by aligning and positioning the left side rear cylinder grate 14 adjacent to the left rear cylinder of the V-twin motorcycle engine with front and rear cylinders 26. Step 3 is performed by aligning and positioning the right side cylinder grate 16 adjacent to both the right front cylinder and right rear cylinder of the V-twin motorcycle engine with front and rear cylinders 26. Step 4 is performed by inserting one mounting flat washers 22 onto each of the three mounting bolts 20. Step 5 is performed by aligning and inserting the three mounting bolts 20 through the mounting brackets 18 of the left side front cylinder grate 12 the left side rear cylinder grate 14 and further aligning and inserting the three mounting bolts 20 through the mounting brackets 18 of the right side cylinder grate 16. Step 6 is performed by inserting one mounting flat washers 22 onto each of the three mounting bolts 20. Step 7 is performed by inserting and threading the three mounting lock nuts 24 onto the three mounting bolts 20. Step 8 is performed by tightening the three mounting lock nuts 24 to the three mounting bolts 20 with an applied torque value of 20 IN LBS.

Referring now to FIG. 1, FIG. 2 and FIG. 3, the present invention Custom Cylinder Grate Assembly (CCGA) 10 can be fabricated in support of different motorcycle brands, styles, models, build years including various types and sizes of engine air cleaners for both carbureted and fuel injected V-twin motorcycle engines with front and rear cylinders 26. Although the left side front cylinder grate. 12, left side rear cylinder grate 14, and right side cylinder grate 16 as illustrated are typically constructed of ½"×⅛" thick flat steel and 3/16" round steel dowel rod materials the left side front cylinder grate 12, left side rear cylinder grate 14 and right side cylinder grate 16 can be constructed of other various types, sizes and forms of metals materials. The types of metal materials can include, but are not limited to, steel, stainless steel, aluminum, copper, various alloy materials, square stock, round stock, pipe and tubing. The arrangement of the metal materials can be altered in different fashion to reflect different visual images and can further be added to or decreased in quantity and size to support the needs of a variety and types of V-twin motorcycle engines with front and rear cylinders 26. The overall invention Custom Cylinder Grate Assembly (CCGA) 10 including the three main components left side front cylinder grate 12, left side rear cylinder grate 14 and right side cylinder grate 16 metal surfaces are typically top coated with chrome plating the surfaces can be top coated with finishes other than chrome to accommodate the desire of the motorcycle owner. The types of surface finishes or top coat finishes can include, but are not limited to, gold plating, nickel plating, powder coating and paint. The left side front cylinder grate 12, left side rear cylinder grate 14, and right side cylinder grate 16 can support a variety of additions and bolt-on trimmings that can be affixed to the exterior facade of the left side front cylinder grate 12, left side rear cylinder grate 14 and right side cylinder grate 16 therefore providing the motorcycle enthusiast an opportunity to further compliment the present invention's custom appearance with a unique or personal touch. The additions and trimmings can include, but is not limited to, medallions, logos, emblems and personalized plates.

As shown and defined in the aforementioned disclosure and illustrations, the nature of the present invention design supports several particular utilities, specifically as related to benefits associated with burn injury risk reduction for motorcycle operators, V-twin motorcycle engine cylinder protection and to serve as a contoured silhouette of the V-twin motorcycle engine cylinders providing a cosmetic custom appearance.

Once given the above disclosure potential may exist for other features, modifications, appearances or improvements that may become apparent to a skilled craftsman, fabricator, tradesman, inventor, designer or artisan. Such other features, modifications, appearances and improvements are therefore considered to be part of this invention, the scope of which is to be determined by the following claims.

The invention claimed is:

1. An add-on accessory apparatus for V-twin motorcycle engines configured of three main components the left side front cylinder grate, left side rear cylinder grate and right side cylinder grate, the three main components are supportive of each other to create an assembly that performs three functions simultaneously which includes: protecting V-twin engine cylinders from damage, reduces risk of burn injuries for motorcycle operators and provides an attractive cosmetic custom appearance comprising;
   a three piece component assembly configured of metal materials contoured to mount adjacent to and profile the V-twin motorcycle engine cylinders producing a cosmetic custom appearance without modification to the motorcycle;
   an arrangement of ½"×⅛" thick flat steel and 3/16" round steel dowel rod, the flat and round steel metal materials are cut to length, contoured, shaped, aligned, spaced and welded together providing a silhouette image of V-twin engine cylinders;
   an arrangement of affixed mounting brackets on the three main components which are held in position adjacent to the V-twin engine cylinders with hardware comprised of three mounting bolts, three mounting locknuts and six mounting flat washers;
   an offset of approximately 1" of the mounted three main components away from the V-twin motorcycle engine cylinders providing a physical barrier between hot V-twin engine cylinders and motorcycle operators;
   a variation of the quantity, shape, type and size of the metal materials used for construction of the three main components to support different types of motorcycles outfitted with V-twin type motorcycle engines.

2. An add-on accessory apparatus assembly for V-twin motorcycle engines according to claim 1 wherein the three main components are constructed of steel or like metal materials that encircles, shields and produces an approximate 1" barrier adjacent to and between the V-twin motorcycle engine cylinders protecting V-twin motorcycle engine cylinders from flying road debris damage and environmental elements while permitting adequate airflow to the engine cylinders for cooling purposes.

3. An add-on accessory apparatus assembly for V-twin motorcycle engines according to claim 2 wherein an approximate 1" barrier reduces the risk of potential burns and injury to motorcycle operators caused by direct bodily contact with hot V-twin motorcycle engines cylinders.

4. An add-on accessory apparatus assembly for V-twin motorcycle engines according to claim 1 which is contoured, shaped and indented to replicate the silhouette image of the V-twin motorcycle engine cylinders and is surface coated or plated with chrome or like finishes to provide a aesthetic custom appearance to the front, rear and sides of the V-twin motorcycle engine cylinders.

5. An add-on accessory apparatus assembly for V-twin motorcycle engines according to claim 1 which can be adaptable to an array of different brands, styles, models and build years of motorcycles outfitted with carbureted or fuel injected V-twin cylinder type design motorcycle engines without impeding performance or functionality of the motorcycle.

\* \* \* \* \*